July 30, 1957     S. C. HETH     2,800,760
COMBINE HEADER TILT DEVICE
Filed Dec. 31, 1954     2 Sheets-Sheet 1
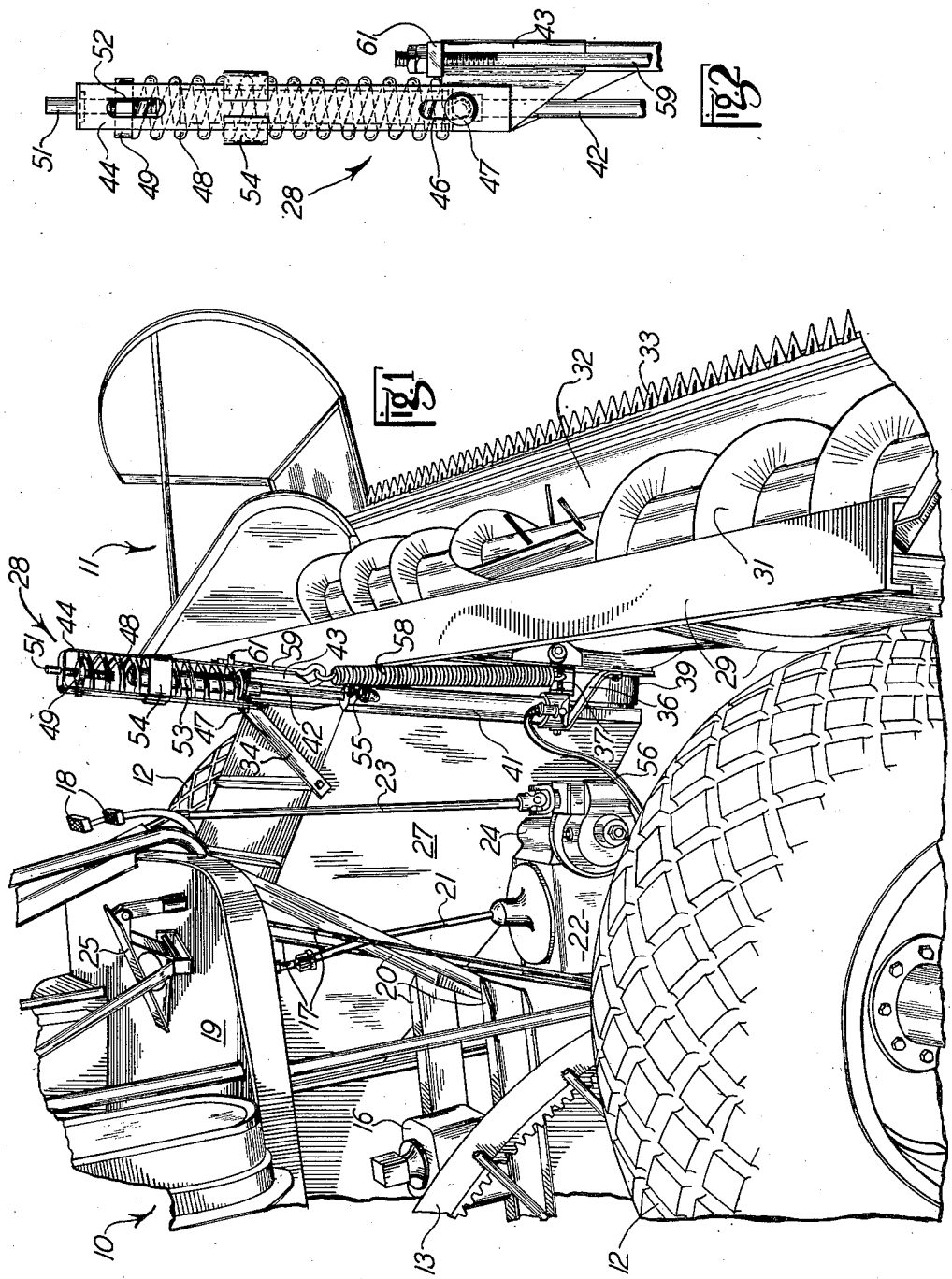
INVENTOR:
SHERMAN C. HETH
BY: Emerson B Donnell
ATTORNEY

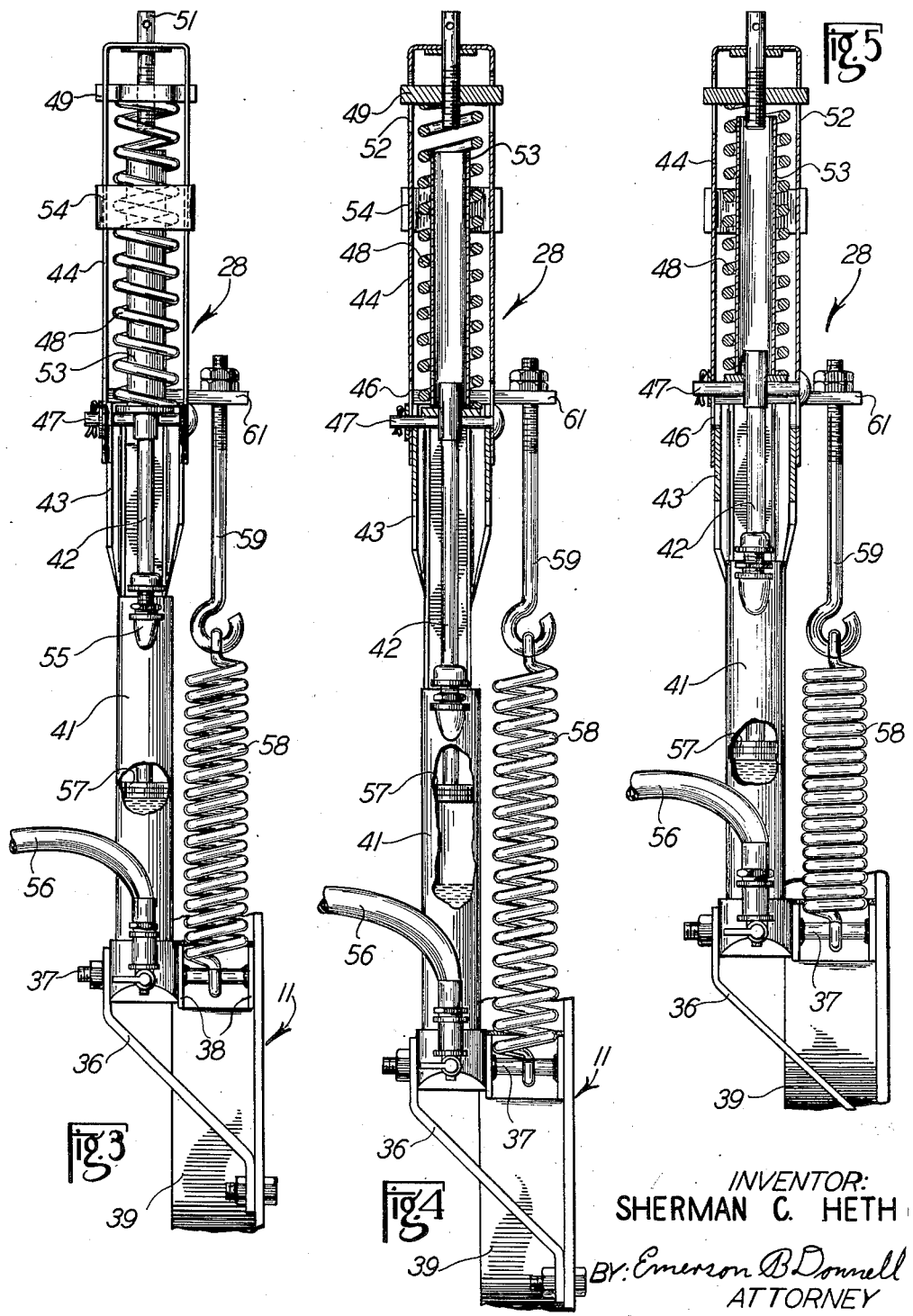

United States Patent Office 2,800,760
Patented July 30, 1957

2,800,760

COMBINE HEADER TILT DEVICE

Sherman C. Heth, Racine, Wis., assignor to J. I. Case Company, Racine, Wis., a corporation of Wisconsin Application December 31, 1954, Serial No. 479,173

5 Claims. (Cl. 56—209)

This invention relates to combines, and, more specifically, it relates to a combine header tilt device.

In the past, combines have been made for operation on hillsides with provisions on the combines for maintaining the threshing units level while the wheels and the header units assume a position parallel to the hillside. In this manner, the thresher of a combine can operate in its most efficient level position, and the header can cut the crop at a selected height parallel to the ground. Various means have been devised for rotating the header about the longitudinal axis of the combine, but none of the means have been found to be entirely satisfactory. Double acting hydraulic cylinders have been employed, but they are too rigid since the hydraulic fluid is incompressible and, therefore, forces applied to the header are transmitted back to other parts to occasionally cause damage. Single acting cylinders have also been employed, but in one direction they too are rigid and can do damage to parts of the combine, that is when forces are transmitted therethrough.

Therefore, it is an object of this invention to provide a combine header tilting device which is an improvement over presently known tilting devices.

A more specific object is to provide a combine header tilting device which operates automatically to adjust the header to the slope of the ground.

Still another object is to provide a combine header tilting device which incorporates a safety feature to avoid damage to the header and related parts if the header strikes an object or encounters a rise in the ground.

It is a further object of this invention to provide a combine header tilting hydraulic system which is protected from excessive forces if the header is restricted in any way.

Other objects and advantages will become apparent upon reading the following description in conjunction with the accompanying drawings, wherein, Fig. 1 is a side perspective view of a fragment of a combine containing one preferred embodiment of this invention.

Fig. 2 is an enlarged front elevational view of a fragment of the embodiment shown in Fig. 1.

Fig. 3 is an enlarged side elevational view of a fragment of the embodiment shown in Fig. 1 with parts broken away.

Fig. 4 is a view similar to that of Fig. 3, but with parts in a different position and partially sectioned.

Fig. 5 is another view similar to that of Fig. 3, but with parts in still a different position and partially sectioned.

Similar reference numerals refer to similar parts throughout the several views.

Fig. 1 shows a fragment of a combine containing a thresher unit or body 10 and a forwardly located harvester or header portion 11. The combine is mounted on wheels, such as wheels 12, which support the combine for the usual movement over the ground during operation of the combine. The wheels 12 are mounted in a well-known manner to permit different vertical positioning between the wheels on opposite sides on the combine when operating on a hillside. The usual toothed bar 13 is employed to permit the wheel positioning mentioned. The toothed bar on the opposite side of the combine is not shown. No further description of that part of the combine is necessary here since it is conventional and fully disclosed elsewhere, such as in U. S. Patent No. 1,877,520.

The controls for operating the leveling mechanism are also conventional and are shown to consist of the gear box 16 which serves as a housing for the clutch to transmit power to the usual leveling shaft. The usual brake rods 17 extend from the brake pedals 18 above a platform 19 which supports the operator. Frame members 20 are disposed below the platform 19 to provide the support for the latter. Also, the gear shift rod 21 extends through the platform 19 to the gear box 22 to provide means for running the combine at different speeds as is common. A control shaft 23 extends from the platform to a gear housing 24 which operates the raising and the lowering of the header unit 11 in the usual manner. The usual accelerator pedal 25 is also located above the platform. The foregoing mentioned construction is conventional and, therefore, it need not be described further.

A feeder house 27 is suitably connected to the thresher unit 10 to project therefrom downwardly toward the front of the combine. The house 27 contains the usual conveyor for transporting the crop into the thresher. The forward end of the house 27 is preferably circular and mates with a circular portion on the rear of the header 11. With this arrangement, it should be understood that the header can be rotated with respect to the thresher unit 10 about the longitudinal axis of the combine. Hydraulic mechanism or fluid pressure motor 28, described later, effects the rotation of the header and is, therefore, a header tilt device. The combine is shown without the usual forwardly located reel, but the header frame 29 is shown with the auger 31 and the auger trough 32. Also, the usual sickle 33 is disposed in front of the trough 32 to cut the crops as desired and allow them to pass into the trough 32. The auger, of course, feeds the crops into the house 27.

The mechanism 28 is suitably attached at an upper end to the house 27 through means such as a bracket 34, and it is attached at its lower end to the header 11 through a brace 36 and a stud 37, with the latter two forming a connection between the header 11 and the mechanism 28. The latter is shown welded to a pair of plates 38 which are suitably attached to a circular flange 39 of the header 11. Thus, the mechanism 28 is suitably attached between the house 27 and the header 11 with the connection at the latter made on the side of the circular portion 39 of the header near the orizontal center line thereof.

A hydraulic or fluid cylinder 41 is pivotally mounted at its lower end on the stud 37 to be disposed in a substantially vertical position along the side of the house 27. A cylinder piston rod 42 projects from the cylinder 41 and thereabove to the upper end of the bracket 34. The latter attaches to a post 43 which is thus suitably connected to the house 27 to extend upwardly in substantial alignment with the cylinder 41. The post 43 has a wrapper 44 attached thereto with the latter open on two opposite sides, and Fig. 2 shows that the other two opposite sides contain a vertically disposed slot 46 to receive a pin 47. The extended end of the rod 42 is attached to the pin 47 so the piston rod is secured within the limits of the slot 46 and the slot 46 and the pin 47 therefore form a lost motion connection between the piston rod 42 and the thresher portion 10 of the combine. The wrapper 44 also receives a compression spring 48 disposed between the pin 47 and an adjustable block 49 in the upper end of the wrapper. A screw 51 is axially fixed at the upper end of the wrapper 44 and threadedly engages the block 49 which is received in an upper slot 52 in the wrapper 44. Thus, the block is adjustable within the limits of the slot 52, and the pressure on the spring 48 can be varied. A tube 53 is preferably positioned within the spring 48 to guide the latter and maintain it in position. Also a wrapper guide 54 is preferably attached around the wrapper 44 to keep it rigid. With this arrangement, the spring 48 urges the piston rod 42 downwardly into the cylinder 41.

It will be noted that the cylinder 41 is a single acting cylinder in that it contains a hydraulic connection at one end only. The lower end attaches in a conventional manner to a hydraulic hose or fluid pressure connection 56 which communicates with the interior of the cylinder. Fig. 3 shows that the lower end of the rod 42 is provided with the usual piston 57 to be actuated by the hydraulic fluid. The upper end of the cylinder 41 is preferably provided with a breather connector 55.

A tension spring 58 is attached at its lower end to the stud 37 and at its upper end to an eye bolt 59. The latter is adjustably secured to the post 43 through a support bar 61 which is suitably secured to the post. The cylinder 41 and the header 11 are thus urged upwardly by the spring 58 with, of course, the header being urged in a rotating direction. The tension on the spring 58 can readily be varied to permit the desired upward force on the header and thereby maintain the latter in position.

Fig. 3 shows the mechanism 28 in a neutral position when the piston is engaged with the hydraulic fluid. If, with regard to the combine direction of movement, the left side of the header shown in Fig. 1 were to be raised, as, for example, by striking an obstruction on the ground, the header would rotate with respect to the house 27 in the direction to expand the spring, such motion also moving cylinder 41 downwardly and separating piston 57 and the fluid in cylinder 41 as shown in Fig. 4. It returns to the position of Fig. 3 under the influence of the spring 58.

Also, if the right side of the header were raised by rotation, the stud 37 would be raised with the header rotation and also the cylinder 41. To accommodate this, the piston rod 42 will be raised along with the pin 47 which slides in the slots 46 against the spring 48 as shown in Fig. 5.

Of course, increasing the hydraulic fluid in the cylinder 41 will also cause the header to rotate as the cylinder is lowered to correspondingly lower the stud 37. The reduction of fluid in the cylinder will cause the reverse action by allowing the spring 58 to raise the stud 37 to thereby rotate the header in the opposite direction. It is preferred that the fluid in the cylinder 41 be controlled through the hose 56 which may be connected to a source which acts in response to the raising and the lowering of the combine wheels as previously mentioned. The header is then rotated in response to the positioning of the wheels. As shown, if the right wheel were raised, the right side of the header would also be raised by the decrease in hydraulic fluid in the cylinder 41, caused by the raising of the wheel, and the spring 58 would urge the right side of the header upwardly as the fluid maintains contact with the piston 57. If the wheel on the right is lowered, the opposite action will occur causing an increase in hydraulic pressure in the cylinder 41 and thus extending the spring 58 as the right side of the header 11 moves downwardly. It should be understood that the spring 48 is sufficiently strong to normally maintain the pin 46 in the bottom of the slot 47. In the embodiment shown, the spring 48 is a safety spring and the spring 58 is a return spring when each spring acts, as described, to effect a lost motion means between the thresher unit and the header unit.

While a specific embodiment of this invention has been shown and described, it should be obvious that certain changes can be made in the construction, and, therefore, the scope of this invention should be limited only by the appended claims.

I claim:

1. In a combine, a header tilt device comprising in combination a header rotatably attached to said combine, a single acting fluid cylinder attached to said header for rotating the latter about a longitudinal axis on said combine, a piston movably disposed within said cylinder, a piston rod attached to said piston to project axially of said cylinder, a first spring attached between said combine and said cylinder to yieldingly urge said piston and the fluid in said cylinder into engagement, a second spring operable between said combine and said piston rod to yieldingly urge said rod axially of said cylinder, and fluid pressure means connected to said cylinder to alter the pressure of the fluid within said cylinder and thereby rotate said header on said combine.

2. In a combine, a header tilt device comprising in combination a header rotatably attached to said combine, a single acting fluid cylinder attached to said header to rotate the latter, a piston axially movably disposed within said cylinder, a piston rod attached to said piston to project axially of said cylinder and connect to said combine in a lost motion connection with said combine having two motion limits spaced axially with respect to said piston rod, a first spring operable between said combine and said cylinder to yieldingly urge said piston and the fluid in said cylinder into contact, a second spring operable between said combine and said piston rod to yieldingly urge said rod axially of said cylinder toward one limit of lost motion of said piston rod with said combine, and a fluid pressure connection at said cylinder for altering fluid pressure within said cylinder and thereby urging said piston rod toward the other limit of lost motion of said piston rod with said combine upon increasing fluid pressure within said cylinder.

3. In a combination harvester thresher of the type including a thresher body having oppositely laterally disposed supporting wheels which are adjustable up and down to provide side to side leveling of the thresher body for running on sloping ground, a harvester portion pivotally connected in crop feeding relation across the front of said thresher body, a fluid pressure motor for rocking said harvester in the direction necessary to follow the slope of the ground, said motor comprising a cylinder element and a piston element slidable in said cylinder element, and means to supply pressure fluid to cause such sliding of said piston element; the combination of a connection between one of said elements and said harvester portion, a post member fixed on said thresher body, and resilient means engaged with said post member and connected with the other element of said fluid motor.

4. In a combination harvester thresher of the type including a thresher body having oppositely laterally disposed supporting wheels which are adjustable up and down to provide side to side leveling of the thresher body for running on sloping ground, a harvester portion pivotally connected in crop feeding relation across the front of said thresher body, a fluid pressure motor for rocking said harvester in the direction necessary to follow the slope of the ground, said motor comprising a cylinder element and a piston element slidable in said cylinder element, and means to supply pressure fluid to cause such sliding of said piston element; the combination of a connection between one of said elements and said harvester portion, a post member fixed on said thresher body, a wrapper attached to said first post in position to receive one of the elements of said fluid motor, and a spring disposed within the wrapper and engaged with one end thereof, and said element being engaged with the other end of said spring for movement of said harvester in one direction without actuation of said motor.

5. In a combination harvester and thresher machine of the type including a thresher body having oppositely laterally disposed supporting wheels which are adjustable up and down to provide side to side leveling of the thresher body for running on sloping ground, a header portion pivotally connected in crop feeding relation across the front of said thresher body, a single acting hydraulic mechanism for rocking said header in the direction necessary to follow the slope of the ground, said mechanism comprising a cylinder element and a piston element slidable in said cylinder element, and means to supply fluid pressure into said cylinder on one side of said piston to cause such sliding of said piston element; the combination of a connection between one of said elements and said header portion, means fixed on said thresher body, a wrapper attached to said means in position to receive one of the elements of said hydraulic mechanism on the side thereof opposite to said one side of said cylinder, a spring disposed within the wrapper and engaged with one end thereof, said element being engaged with the other end of said spring for urging said piston and said cylinder against said fluid pressure within said cylinder, and a second spring attached between said header and said means for also urging said piston and said cylinder against said fluid pressure within said cylinder.

References Cited in the file of this patent
UNITED STATES PATENTS

| | | |
|---|---|---|
| 1,135,618 | Rhodes | Apr. 13, 1915 |
| 2,514,764 | Herigstad | July 11, 1950 |
| 2,709,329 | Neal | May 31, 1955 |
| 2,753,675 | Harp | July 10, 1956 |